(12) United States Patent
Takumi et al.

(10) Patent No.: US 12,409,460 B2
(45) Date of Patent: Sep. 9, 2025

(54) YARN AND STRUCTURE CONTAINING THE SAME

(71) Applicant: Murata Manufacturing Co., Ltd., Nagaokakyo (JP)

(72) Inventors: Kenichiro Takumi, Nagaokakyo (JP); Ryo Todo, Osaka (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 310 days.

(21) Appl. No.: 17/895,448

(22) Filed: Aug. 25, 2022

(65) Prior Publication Data

US 2022/0410174 A1 Dec. 29, 2022

Related U.S. Application Data

(63) Continuation of application No. PCT/JP2021/010408, filed on Mar. 15, 2021.

(30) Foreign Application Priority Data

Mar. 30, 2020 (JP) ................. 2020-060864

(51) Int. Cl.
*B03C 3/45* (2006.01)
*D02G 3/02* (2006.01)
(Continued)

(52) U.S. Cl.
CPC ................. *B03C 3/45* (2013.01); *D02G 3/02* (2013.01); *D02G 3/447* (2013.01); *D02G 3/449* (2013.01);
(Continued)

(58) Field of Classification Search
CPC .......... D02G 3/02; D02G 3/447; D02G 3/449; D10B 2331/041; D10B 2401/13;
(Continued)

(56) References Cited

U.S. PATENT DOCUMENTS

| | | | | |
|---|---|---|---|---|
| 2012/0315225 A1* | 12/2012 | Porbeni | ................... | A61L 31/06 524/502 |
| 2013/0239289 A1* | 9/2013 | Iwashita | .................. | D02G 1/02 2/69 |

(Continued)

FOREIGN PATENT DOCUMENTS

| | | | |
|---|---|---|---|
| JP | 2014188467 A | 10/2014 | |
| JP | 6428979 B1 | 11/2018 | |

(Continued)

OTHER PUBLICATIONS

International Search Report in PCT/JP2021/010408, mailed May 25, 2021, 3 pages.

(Continued)

*Primary Examiner* — Jennifer A Gillett
(74) *Attorney, Agent, or Firm* — ArentFox Schiff LLP

(57) ABSTRACT

A yarn containing a potential-generating filament. The yarn is constructed such that a positive or negative surface electrical potential is generated by applying an external force to the yarn in an axial direction of the yarn, and constructed such that a controlled surface electrical potential is generated by a maintenance or release of the external force.

14 Claims, 17 Drawing Sheets

(51) Int. Cl.
  *D02G 3/44* (2006.01)
  *H01B 3/20* (2006.01)

(52) U.S. Cl.
  CPC .... *D10B 2331/041* (2013.01); *D10B 2401/13* (2013.01); *D10B 2401/16* (2013.01); *D10B 2505/04* (2013.01); *H01B 3/20* (2013.01)

(58) Field of Classification Search
  CPC ............ D10B 2401/16; D10B 2505/04; H01L 41/082; H01L 41/193; H01L 41/113; B03C 3/45; B03C 3/60; B03C 3/28; H01B 3/20; B01D 39/16
  See application file for complete search history.

(56) References Cited

U.S. PATENT DOCUMENTS

| | | | | |
|---|---|---|---|---|
| 2014/0084204 | A1* | 3/2014 | Tanimoto | C08G 63/06 252/62.9 R |
| 2014/0103554 | A1* | 4/2014 | Koslow | D01D 5/003 524/173 |
| 2019/0003905 | A1* | 1/2019 | Yoshida | H10N 30/857 |
| 2019/0038787 | A1 | 2/2019 | Ando | |
| 2020/0157709 | A1* | 5/2020 | Kanematsu | H10N 30/702 |
| 2021/0268414 | A1 | 9/2021 | Inoue et al. | |

FOREIGN PATENT DOCUMENTS

| | | | | |
|---|---|---|---|---|
| WO | WO-2018211817 A1 * | 11/2018 | | A61L 2/03 |
| WO | WO-2018221332 A1 * | 12/2018 | | D02G 3/02 |
| WO | 2019069660 A1 | 4/2019 | | |
| WO | 2019077957 A1 | 4/2019 | | |

OTHER PUBLICATIONS

Microbial Control- Science and Engineering published by Kodansha Ltd, Copyright T. Tsuchido, H. Kourai, H. Matsuoka, J. Koizumi, 2002; "Electrical Control" Section 4.1.3, (Translation of section 4.1.3, p. 50).

Takaki, Koichi; "Agricultural and Food Processing Applications of High-Voltage and Plasma Technologies"; J. HTSJ, vol. 51, No. 216, Jul. 2012, pp. 64-69. (Translation of Section 5 p. 67 "Freshness retention and component extraction by high voltage").

* cited by examiner

YARN AND STRUCTURE CONTAINING THE SAME

CROSS REFERENCE TO RELATED APPLICATIONS

The present application is a continuation of International application No. PCT/JP2021/010408, filed Mar. 15, 2021, which claims priority to Japanese Patent Application No. 2020-060864, filed Mar. 30, 2020, the entire contents of each of which are incorporated herein by reference.

BACKGROUND OF THE INVENTION

Field of the Invention

The present invention relates to a yarn, more specifically, a yarn containing an "electric field-forming filament" (or a fiber capable of forming an electric field by surface charges), wherein a positive or negative surface electrical potential is generated by applying an external force to the yarn in an axial direction of the yarn, and a "controlled surface electrical potential" is generated by the "maintenance" or "release" of the external force. The present invention also relates to a structure such as a filter or a cloth containing such a yarn.

Description of the Related Art

Conventionally, a fibrous material having chargeability has been used for electret filters and the like (for example, JP-A-2014-188467).

The present inventors have noticed that conventional electret filters, especially, fibrous materials with chargeability contained therein have problems to overcome, and have found that there is a need to make improvements thereon. Specifically, the present inventors have found that there are the following problems.

Generally, the conventional electret filters collect a dust in a gas by an electric force thereof utilizing one of a positive charge (or electrical potential) and a negative charge (or electrical potential) given during the manufacturing of the electret filters.

According to the study by the inventors of the present application, it has been found that although a rapid decrease in dust collection efficiency (or dust collection power) can be suppressed to some extent by selecting a fibrous material (for example, Patent Document 1), the provided charges (or electrical potential) disappear or decrease with the lapse of time, and the dust collection power due to the charges (or electrical potential) also eventually disappear or decrease. In addition, it has also been found that such dust collection power is not restored again.

SUMMARY OF THE INVENTION

The present invention has been devised in view of such problems, and a main object of the present invention is to provide a yarn capable of generating a "controlled surface electrical potential", such as keeping a generated electrical potential or restoring a disappeared electrical potential, for an arbitrary period of time. It is also an object of the present invention to provide a structure such as a filter or a cloth containing such a yarn.

As a result of intensive studies, the inventors of the present application found a yarn that contains an electric field-forming filament (or a fiber capable of forming an electric field by surface charges) and that, when an external force is applied thereto in the axial direction thereof to generate a positive or negative surface electrical potential and then the external force is "maintained" or "released", the yarn can keep or disappear (or relax) the generated surface electrical potential, restore the disappeared surface electrical potential, or invert the polarity of the surface electrical potential, for example, for an arbitrary time; and a yarn constructed to generate a "controlled surface electrical potential". As a result, the present inventors have accomplished the invention of a yarn that has achieved the main object described above.

According to the present invention, there can be provided a yarn comprising an "electric field-forming filament", wherein the yarn is constructed such that a positive or negative surface electrical potential is generated by applying an "external force" to the yarn in an axial direction of the yarn and a "controlled surface electrical potential" is generated by "maintenance" or "release" of the external force (for example, a yarn capable of keeping the generated surface electrical potential or disappear the surface electrical potential, or restore the disappeared surface electrical potential, or invert the polarity of the surface electrical potential). The present invention can also provide a structure such as a filter or a cloth containing such a yarn.

According to the present invention, it is possible to provide a yarn capable of generating a "controlled surface electrical potential", and a product such as a filter or a cloth containing such a yarn.

DETAILED DESCRIPTION OF THE PREFERRED EMBODIMENTS

Figure 1A:
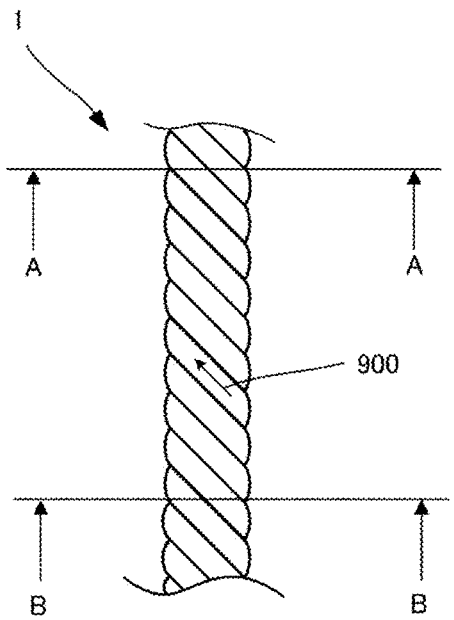
FIG. 1A is a diagram illustrating the configuration of a yarn 1 (S yarn)

Hereinafter, a yarn according to one embodiment of the present invention (hereinafter, sometimes briefly referred to as "yarn of the present disclosure" or simply "yarn") will be described in detail. Although the description will be made with reference to the drawings as necessary, elements in the drawings are merely schematically and exemplarily shown for understanding of the present invention, and appearance, dimensional ratios, and the like may differ from actual ones.

The yarn of the present disclosure comprises an "electric field-forming filament" (or a fiber capable of forming an electric field by surface charges) and is characterized in that a positive or negative surface electrical potential is generated by applying an external force to the yarn in an axial direction of the yarn and in that a "controlled surface electrical potential" can be generated by the "maintenance" or "release" of the external force.

The various numerical ranges referred to herein are intended to include the lower limit and/or the upper limit themselves unless otherwise stated. That is, taking the numerical range of 1 to 10 as an example, it can be interpreted as including the lower limit value "1" and the upper limit value "10".

In addition, some numerical values may be attached with "about" or "approximately", and the term "about" or "approximately" means that the numerical values may include variations of several percent, for example, ±10%, ±5%, ±3%, ±2%, or ±1%.

Hereinafter, [basic configuration of yarn] and [characteristics of yarn] will be described in detail.

[Basic Configuration of Yarn]

The yarn of the present disclosure is composed of a plurality of "electric field-forming filaments". The number of the electric field-forming filaments is not particularly limited, and for example, 2 or more, 2 to 500, preferably 10 to 350, and more preferably about 20 to 200 electric field-forming filaments may be included in the yarn of the present disclosure.

In the present disclosure, an "electric field-forming filament" means a "fiber (filament) capable of generating charges or an electrical potential by external energy to form an electric field" (hereinafter, it is sometimes referred to as a "charge-generating fiber" or an "electrical potential-generating fiber (filament)").

The dimension (length, thickness (diameter), and the like) and the shape (cross-sectional shape and the like) of the electric field-forming filament are not particularly limited. The yarn of the present disclosure containing such an electric field-forming filament may contain a plurality of electric field-forming filaments differing in thickness. Therefore, the yarn of the present disclosure may or may not have a constant diameter in the length direction.

The electric field-forming filament may be a long fiber or may be a short fiber. The electric field-forming filament may have a length (dimension) of, for example, 0.01 mm or more. The length may be appropriately chosen according to a desired application.

The thickness (diameter) of the electric field-forming filament is not particularly limited, and may be the same (constant) or may not be the same along the length of the electric field-forming filament. The electric field-forming filament may have a thickness of, for example, 0.001 μm (1 nm) to 1 mm. The thickness may be appropriately chosen according to a desired application.

The shape, especially, cross-sectional shape, of the electric field-forming filament is not particularly limited, and may have, for example, a circular, elliptical, or profiled cross section. It is preferable to have a circular cross-sectional shape.

The electric field-forming filament preferably contains a material having a photoelectric effect, a material having a pyroelectric effect, or a material having a piezoelectric effect (polarization phenomenon due to external force) or piezoelectricity (the property of generating a voltage when a mechanical strain is applied or, conversely, generating a mechanical strain when a voltage is applied) (hereinafter, sometimes referred to as a "piezoelectric material" or a "piezoelectric substance"). Among them, it is particularly preferable to use a fiber containing a piezoelectric material (hereinafter, sometimes referred to as "piezoelectric fiber"). Since the piezoelectric fiber can form an electric field by piezoelectricity, a power supply is not necessary and there is no risk of electric shock.

In addition, the life of the piezoelectric material contained in the piezoelectric fiber lasts longer than the antibacterial effect by a chemical agent or the like, for example. Such piezoelectric fibers are less likely to cause allergic reactions.

As the "piezoelectric material", any material having a piezoelectric effect or piezoelectricity can be used without particular limitation, and may be an inorganic material such as piezoelectric ceramics or may be an organic material such as a polymer.

The "piezoelectric material" (or "piezoelectric fiber") preferably contains a "piezoelectric polymer".

Examples of the "piezoelectric polymer" include a "piezoelectric polymer having pyroelectricity" and a "piezoelectric polymer having no pyroelectricity".

"Piezoelectric polymer having pyroelectricity" generally means a piezoelectric material composed of a polymeric material that has pyroelectricity and can generate charges (or an electrical potential) on its surface upon only application of temperature changes. Examples of such a piezoelectric polymer include polyvinylidene fluoride (PVDF). In particular, one capable of generating charges (or an electrical potential) on the surface thereof by thermal energy from a human body is preferable.

"Piezoelectric polymer having no pyroelectricity" generally means a piezoelectric polymer made of a polymer material and excluding the "piezoelectric polymer having pyroelectricity" described above. Examples of such a piezoelectric polymer include polylactic acid (PLA). As the polylactic acid, poly-L-lactic acid (PLLA) obtained by polymerizing an L-form monomer, poly-D-lactic acid (PDLA) obtained by polymerizing a D-form monomer, and the like are known.

The yarn of the present disclosure may contain an electric field-forming filament (or a charge-generating fiber) having a configuration in which a conductor is used as a core yarn, the conductor is wound (covered) with an insulator, and a voltage is applied to the conductor to generate charges.

The yarn of the present disclosure may be a yarn obtained by simply paralleling a plurality of electric field-forming filaments (paralleled yarn), or may be a yarn provided with twist (co-twisted yarn). The method of co-twisting to form a yarn is not particularly limited, and conventionally known methods can be used.

Figure 3A:
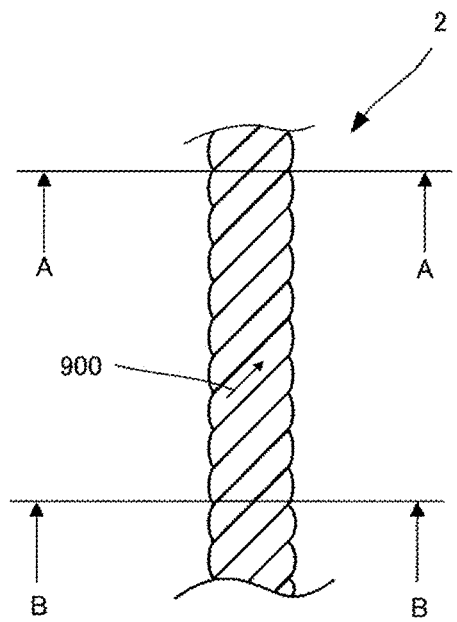
FIG. 3A is a diagram illustrating the configuration of a yarn 2 (Z yarn)

For example, as illustrated in FIG. 1A, the yarn 1 can be configured by co-twisting a plurality of electric field-forming filaments 10. In the embodiment illustrated in FIG. 1A, the yarn 1 is a left-twisted yarn (hereinafter, referred to as "S yarn") in which the electric field-forming filaments 10 are twisted to the left, but may be a right-twisted yarn (hereinafter, referred to as "Z yarn") in which the electric field-forming filaments 10 are twisted to the right (see, e.g., yarn 2 of FIG. 3A). Thus, in the case of a co-twisted yarn, the yarn of the present disclosure may be either an "S yarn" or a "Z yarn".

In the yarn of the present disclosure, the distance between electric field-forming filaments 10 is about 0 μm to about 10 μm, generally about 5 μm. When the interval between the electric field-forming filaments 10 is 0 μm, it means that the electric field-forming filaments are in contact with each other.

Hereinafter, in order to describe the yarn of the present disclosure in detail, examples of the yarn of the present disclosure will be described in more detail with reference to FIGS. 1 to 3 by taking an embodiment in which a piezoelectric material is contained as an electric field-forming filament and the piezoelectric material is a "polylactic acid" as an example.

Polylactic acid (PLA), which can be used as a piezoelectric material, is a chiral polymer, and a main chain thereof has a spiral structure. Polylactic acid can exhibit piezoelectricity when it is uniaxially stretched and molecules thereof are oriented. The piezoelectric constant is increased by further performing heat treatment to increase the crystallinity. By increasing the crystallinity as described above, the value of the surface electrical potential can be improved.

As illustrated in FIG. 1A, the electric field-forming filament (or piezoelectric fiber) 10 containing a uniaxially drawn polylactic acid has tensor components of $d_{14}$ and $d_{25}$ as piezoelectric strain constants where a thickness direction is defined as a first axis, a drawing direction 900 is defined as a third axis, and a direction orthogonal to both the first axis and the third axis is defined as a second axis.

Therefore, the polylactic acid can most efficiently generate charges (or an electrical potential) when strain occurs in a direction of 45 degrees with respect to the uniaxially drawn direction.

The number average molecular weight (Mn) of polylactic acid is, for example, $6.2 \times 10^4$, and the weight average molecular weight (Mw) is, for example, $1.5 \times 10^5$. The molecular weight is not limited to these values.

Figure 2A:
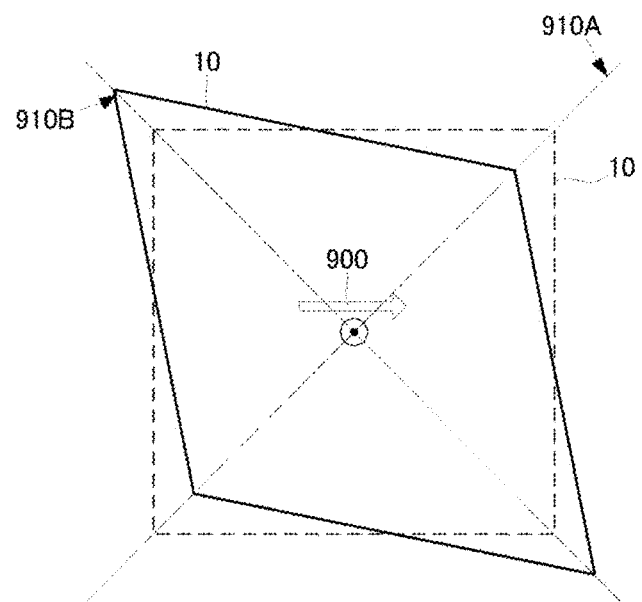
FIGS. 2A and 2B are diagrams showing a relationship among a uniaxial drawing direction of a polylactic acid, an electric field direction, and deformation of an electric field-forming filament (or piezoelectric fiber) 10.
Figure 2B:
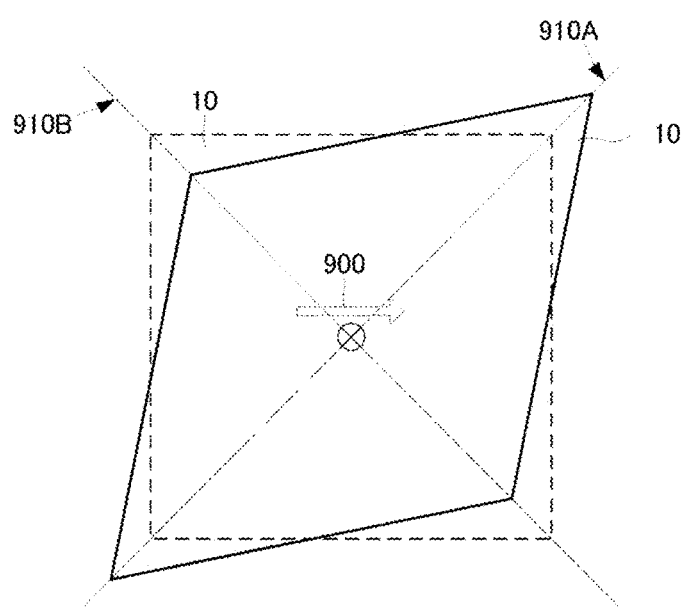

FIGS. 2A and 2B are diagrams showing a relationship among a uniaxial drawing direction of polylactic acid, an electric field direction, and deformation of an electric field-forming filament (or piezoelectric fiber) 10.

As illustrated in FIG. 2A, when the electric field-forming filament 10 contracts in the direction of a first diagonal line 910A and expands in the direction of a second diagonal line 910B orthogonal to the first diagonal line 910A, an electric field can be generated in a direction from the back side toward the front side of the diagram. That is, the electric field-forming filament 10 can generate negative charges on the front side of the diagram. As illustrated in FIG. 2B, the electric field-forming filament 10 can generate charges (or an electrical potential) even when expanding in the direction of the first diagonal line 910A and contracting in the direction of the second diagonal line 910B, but the polarity is inverted, and an electric field can be generated in a direction from the front side of the diagram toward the back side of the diagram. That is, the electric field-forming filament 10 can generate positive charges on the front side of the diagram.

In the polylactic acid, piezoelectricity can be generated by molecular orientation processing by drawing, and thus it does not need to be subjected to poling processing unlike other piezoelectric polymers such as polyvinylidene fluoride (PVDF) or piezoelectric ceramics. The uniaxially drawn polylactic acid has a piezoelectric constant of about 5 to 30 pC/N, and has a very high piezoelectric constant among polymers. Furthermore, the piezoelectric constant of polylactic acid does not vary with time and is extremely stable.

The electric field-forming filament 10 is preferably a fiber having a circular cross section. The electric field-forming filament 10 can be manufactured by, for example, a method of extruding and molding a piezoelectric polymer to form a fiber, a method of melt-spinning a piezoelectric polymer to form a fiber (examples thereof including a spinning-drawing method in which a spinning step and a drawing step are separately performed, a direct drawing method in which a spinning step and a drawing step are connected, a POY-DTY method in which a false twisting step can also be performed simultaneously, or an ultrahigh speed spinning method with an increased speed), a method of forming a fiber from a piezoelectric polymer by a dry or wet spinning method (examples thereof including a phase separation method or a dry-wet spinning method in which a feed polymer is dissolved in a solvent and the solution is extruded through a nozzle to form a fiber, a gel-spinning method of uniformly forming a fiber in a gel state with a solvent contained, or a liquid crystal spinning method of forming a fiber using a liquid crystal solution or a liquid crystal melt), or a method of forming a fiber from a piezoelectric polymer by electrostatic spinning. The cross-sectional shape of the electric field-forming filament 10 is not limited to a circular shape.

Figure 1B:
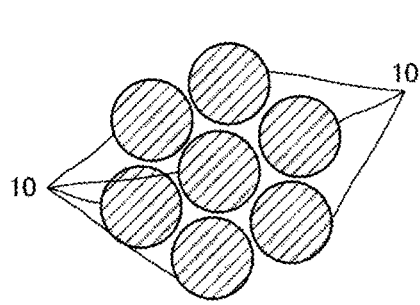
FIG. 1B is a cross-sectional view taken along line A-A of FIG. 1A.
Figure 1C:
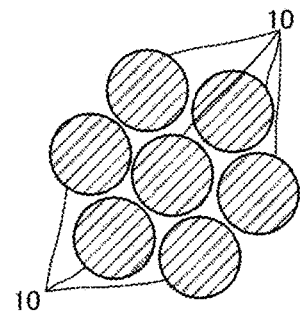
FIG. 1C is a cross-sectional view taken along line B-B of FIG. 1A.

For example, the yarn 1 illustrated in FIG. 1 may be a yarn obtained by twisting a plurality of such electric field-forming filaments 10 containing a polylactic acid (multifilament yarn) (S yarn) (the mode of twisting is not particularly limited). The drawing direction 900 of each electric field-forming filament 10 coincides with the axial direction of each electric field-forming filament 10. Therefore, the drawing direction 900 of the electric field-forming filament 10 is inclined to the left with respect to the axial direction of the yarn 1. The angle depends on the number of twists.

When, for example, tension (preferably tension in the axial direction) or stress (preferably tensile stress in the axial direction) is applied as an "external force" to the yarn 1, which is such an S yarn, negative (−) charges (or electrical potential) are generated on the surface of the yarn 1, and positive (+) charges (or electrical potential) can be generated on the inside thereof.

The yarn 1 can form an electric field by an electrical potential difference that can be generated by the charge. This electric field leaks also into a space in the vicinity and can form a combined electric field with other portions. Furthermore, when an electrical potential to be generated in the yarn 1 is brought close to a predetermined electrical potential, for example, an object having a predetermined electrical potential (including a ground electrical potential) such as a human body, the potential can also generate an electric field between the yarn 1 and the object.

Figure 3B:
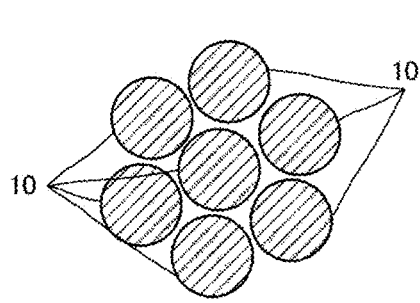
FIG. 3B is a cross-sectional view taken along line A-A of FIG. 3A.
Figure 3C:
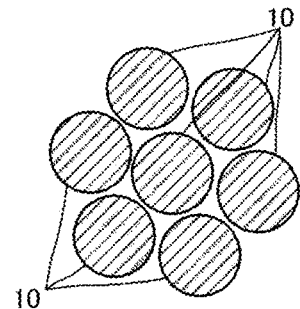
FIG. 3C is a cross-sectional view taken along line B-B of FIG. 3A.

Next, referring to FIG. 3, since the yarn 2 is a Z yarn, the drawing direction 900 of the electric field-forming filament (or piezoelectric fiber) 10 is inclined to the right with respect to the axial direction of the yarn 2. The angle depends on the number of twists of the yarn.

When, for example, tension (preferably tension in the axial direction) or stress (preferably tensile stress in the axial direction) is applied as an "external force" to the yarn 2, which is such a Z yarn, positive (+) charges (or electrical potential) are generated on the surface of the yarn 2, and negative (−) charges (or electrical potential) can be generated on the inside thereof.

The yarn 2 also can form an electric field by an electrical potential difference that can be generated by the charge. This electric field leaks also into a space in the vicinity and can form a combined electric field with other portions. Furthermore, when an electrical potential to be generated in the yarn 2 is brought close to a predetermined electrical potential, for example, an object having a predetermined electrical potential (including a ground electrical potential) such as a human body, the potential can also generate an electric field between the yarn 2 and the object.

Furthermore, when the yarn 1, which is an S yarn, and the yarn 2, which is a Z yarn, are brought close to each other, an electric field can be generated between the yarn 1 and the yarn 2.

The polarities of the charges (or electrical potentials) that can be generated in the yarn 1 and the yarn 2 are different from each other. The electrical potential difference at each position can be defined by an electric field coupled circuit formed by complexly entangling the fibers with each other or a circuit formed by an electric current path that is formed by accident in the yarn by the action of moisture or the like.

The yarn of the present disclosure should not be construed as limited to the above aspects. The method for manufacturing the yarn of the present disclosure is also not particularly limited, and is not limited to the manufacturing method described above.

Furthermore, the yarn of the present disclosure may be provided with a "dielectric material" around the electric field-forming filament. For example, as schematically illustrated in the cross-sectional view of FIG. 4, a dielectric material 100 can be provided around the electric field-forming filament (or piezoelectric fiber) 10.

In the present disclosure, the "dielectric material" means a material containing a material or substance having a "dielectric property" (a property of being electrically positively or negatively polarized (or dielectrically polarized or electrically polarized) by an electric field), and can accumulate charges on a surface thereof.

The dielectric material may be present in the longitudinal axial direction and the circumferential direction of the electric field-forming filament, and may completely or partially cover the electric field-forming filament. When the dielectric material partially covers the electric field-forming filament, the electric field-forming filament itself may be exposed as it is in uncovered portions.

Therefore, the dielectric material may be provided entirely or partially in the longitudinal axial direction of the electric field-forming filament. In addition, the dielectric material may be provided entirely or partially in the circumferential direction of the electric field-forming filament.

Figure 4:
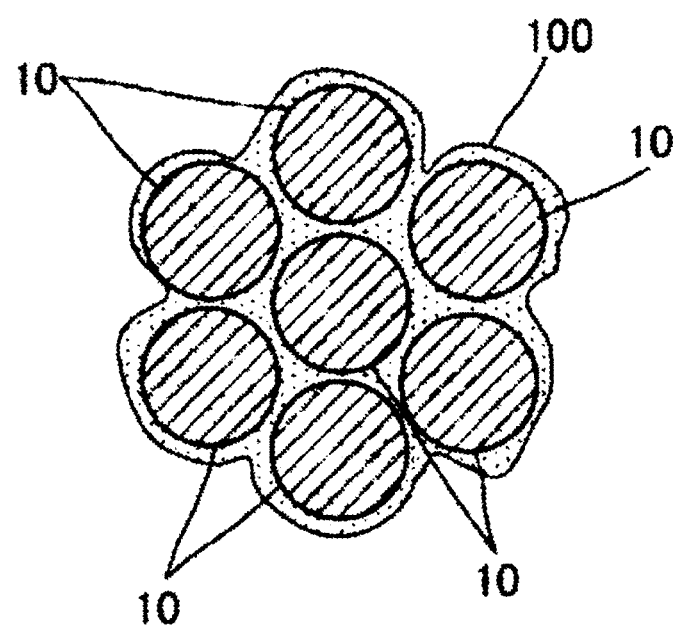
FIG. 4 is a cross-sectional view schematically illustrating a cross section of a yarn of the present disclosure having a dielectric material 100 around the electric field-forming filament 10.

In addition, the dielectric material may be uniform or non-uniform in thickness (see, e.g., FIG. 4).

The dielectric material may be present between electric field-forming filaments, and in this case, there may be a part where the dielectric material is not present between the electric field-forming filaments. In addition, bubbles or cavities may be present in the dielectric material.

The dielectric material is not particularly limited as long as it contains a material or substance having a dielectric property. As the dielectric material, a dielectric material (for example, an oil, an antistatic agent, and the like) known to be usable mainly as a surface treating agent (or a fiber treating agent) in the fiber industry may be used.

In the yarn of the present disclosure, the dielectric material preferably comprises an oil. As the oil, an oil (yarn-making oil) to be used as a surface treating agent (or a fiber treating agent) that can be used in the production of the electric field-forming filament (for example, an anionic, cationic, or nonionic surfactant) can be used. In addition, an oil (for example, an anionic, cationic, or nonionic surfactant) usable as a surface treating agent (or a fiber treating agent) usable in a step of manufacturing cloth (for example, knitting and weaving) and an oil (for example, an anionic, cationic, or nonionic surfactant) usable as a surface treating agent (or a fiber treating agent) usable in a finishing step also can be used. Here, as a representative example, a filament manufacture step, a cloth manufacture step, a finishing step, and the like have been mentioned, but the present invention is not limited to these steps. As the oil, it is preferable to use an oil to be used particularly for reducing friction of the electric field-forming filament.

Examples of the oil include DELION series manufactured by TAKEMOTO OIL & FAT Co., Ltd., MARPOZOL series and MARPOZIES series manufactured by Matsumoto Yushi-Seiyaku Co., Ltd., and Paralatex series manufactured by MARUBISHI OIL CHEMICAL CO., LTD.

The oil may be present entirely or at least partially along the electric field-forming filament. After the electric field-forming filament is processed into a yarn, at least a part or the entire of the oil may fall off from the electric field-forming filament by washing.

In addition, the dielectric material to be used to reduce friction of the electric field-forming filament may be a surfactant such as a detergent or a softener to be used during washing.

Examples of the detergent include Attack (registered trademark) series manufactured by Kao Corporation, TOP (registered trademark) series manufactured by Lion Corporation, and ARIEL (registered trademark) series manufactured by Procter & Gamble Japan K.K.

Examples of the softener include Humming (registered trademark) series manufactured by Kao Corporation, SOFLAN (registered trademark) series manufactured by Lion Corporation, and LENOR (registered trademark) series manufactured by Procter & Gamble Japan K.K.

The dielectric material may have conductivity (property of passing electricity), and in this case, the dielectric material preferably contains an antistatic agent. As the antistatic agent, an antistatic agent to be used as a surface treating agent (or a fiber treating agent) usable in the manufacture of an electric field-forming filament can be used. As the antistatic agent, it is preferable to use an antistatic agent to be used particularly for reducing the loosening of the electric field-forming filament.

Examples of the antistatic agent include Capron series manufactured by NISSIN KAGAKU KENKYUSHO CO., LTD., NICEPOLE series and DEATRON series manufactured by NICCA CHEMICAL CO., LTD.

The antistatic agent may be present entirely or at least partially along the electric field-forming filament. After the electric field-forming filament is processed into a yarn, at least a part or the entire of the antistatic agent may fall off from the electric field-forming filament by washing.

In addition, the above-described surface treating agent (or fiber treating agent), such as an oil or an antistatic agent, the detergent, the softener, or the like may not be present around the electric field-forming filament. That is, the electric field-forming filament and the yarn of the present disclosure may not contain the above-described surface treating agent (or fiber treating agent), such as an oil or an antistatic agent, the detergent, the softener, or the like. In that case, the air (or air layer) present between the electric field-forming filaments can function as a dielectric material. Thus, in this case, the dielectric material contains air.

For example, when yarns with the above-described surface treating agent (or fiber treating agent), such as an oil or an antistatic agent, the detergent, the softener, or the like attached around electric field-forming filaments are subjected to treatment by washing or solvent immersion, yarns not containing the above-described surface treating agent (or fiber treating agent), the detergent, the softener, or the like may be used. In that case, a bare electric field-forming filament will be exposed. Alternatively, in the present invention, a yarn containing only a bare electric field-forming filament may be used.

Furthermore, in the present invention, yarns in which bare electric field-forming filaments are partially exposed as a result of partial removal of the above-described surface treating agent (or fiber treating agent), such as an oil or an antistatic agent, the detergent, the softener, or the like by treatment such as washing or solvent immersion also may be used.

The thickness of the dielectric material (or the interval between the electric field-forming filaments) is about 0 μm to about 10 μm, preferably about 0.5 μm to about 10 μm, more preferably about 2.0 μm to about 10 μm, and generally approximately 5 μm.

[Characteristics of Yarn]

The yarn of the present disclosure comprises the above-described "electric field-forming filament", and is characterized in that a positive or negative "surface electrical potential" can be generated by "applying an external force (F)" to the yarn in an "axial direction of the yarn", and a "controlled surface electrical potential" is generated by the "maintenance" or "release" of the "external force (F)".

In the present disclosure, the "axial direction of the yarn" means the main axis direction (or uniaxial direction) of the yarn. For example, when the yarn is a "paralleled yarn", it means the axial direction of the yarn after paralleling (or the axial direction of paralleled electric field-forming filaments), and when the yarn is a "co-twisted yarn", it means the axial direction of the yarn after twisting.

In the present disclosure, the "external force (F)" means any force due to an external energy (E) applied to the yarn, for example, means tension (or tensile force), and includes stress (tensile stress).

In the present disclosure, "apply an external force (F)" means apply an external energy (E) to the yarn, for example, means apply tension (or tensile force), stress (tensile stress), and the like to the yarn.

In the present disclosure, the "surface electrical potential" of a yarn means an electrical potential (or charges) generated on a surface of the yarn, and can be measured using, for example, an electric force microscope (EFM) as described in detail below.

In the present disclosure, "maintenance" of an "external force (F)" means continue or maintain the external force (F) applied to the yarn. For example, when the yarn is extended to displace in the axial direction by the external force (F) (for example, in the displacement from the initial length ($L_0$) of the yarn in any axial direction to the length ($L_1$) after the displacement of the yarn), it means restrain (or fix) at least the length ($L_1$) attained by the displacement of the yarn.

In the present disclosure, "release" of an "external force (F)" means remove the external force (F) applied to the yarn. For example, when the yarn is extended to displace in the axial direction by the external force (F) (for example, in the displacement from the initial length ($L_0$) of the yarn in any axial direction to the length ($L_1$) after the displacement of the yarn), it means remove the external force (F) applied to the yarn, preferably means return to the initial length ($L_0$).

In the present disclosure, the phrase that the "controlled surface electrical potential" is generated means that the "surface electrical potential" generated by the application of the "external force (F)" is intentionally changed (or adjusted) by the "maintenance" and/or the "release" of the "external force (F)". For example, it means change (or regulate or control) the "surface electrical potential" generated by the application of the "external force (F)" over an arbitrary period of time. More specifically, it means at least that the surface electrical potential generated by the application of the external force (F) "disappears" within a predetermined time, that the surface electrical potential is "kept" for more than a predetermined time, that the polarity of the surface electrical potential generated by the application of the external force (F) "inverts", or that the surface electrical potential that has disappeared is "restored". In the present invention, the "controlled surface electrical potential" is not limited to the above examples.

Figure 5:
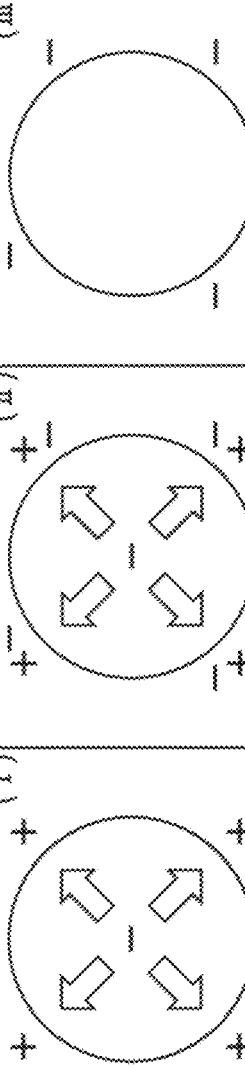
FIG. 5 is a conceptual diagram schematically illustrating a "controlled surface electrical potential" of a yarn (Z yarn) according to one embodiment of the present invention.

For example, as illustrated in the row (A) in FIG. 5, in the yarn of the present disclosure (for example, the above-mentioned "yarn 2" (Z yarn)), (I) a positive (+) surface electrical potential is "generated" by "applying" an external force (F) in an axial direction of the yarn, (II) a negative (−) surface electrical potential is further generated on a surface of the yarn by "maintaining" the external force (F), so that the surface electrical potentials cancel each other to become zero (0) and the surface electrical potentials "disappear", and (III) the positive (+) surface electrical potential generated by the "application" of the external force (F) is disappeared by the "release" of the external force (F), so that only the negative (−) surface electrical potential remains and, as a result, the polarity of the surface electrical potential can be "inverted".

The "controlled surface electrical potential" shown in the row (A) is mainly based on the "disappearance" (or relaxation) of the surface electrical potential of (II), and the mechanism thereof will be described in detail below together with the configuration of the yarn. However, the present invention is not limited to the mechanism described below.

Mechanism of (A)

For example, in the yarn of the present disclosure ("yarn 2" (Z yarn)), a positive (+) surface electrical potential is generated on the surface of the yarn by "applying" an external force (F) (for example, tension or stress) in the axial direction of the yarn, and a negative (−) electrical potential is generated inside the surface (I). When the external force (F) is "maintained", for example, a negative (−) surface electrical potential can be generated due to the "dielectric property" of the surface of the yarn (specifically, the electric field-forming filament), so that the positive (+) surface electrical potential and the negative (−) surface electrical potential cancel each other to zero (0), the surface electrical potential is "relaxed", and the positive (+) surface electrical potential can "disappear" (II).

In the present invention, for example, a negative (−) surface electrical potential can be induced or generated by providing the above-described "dielectric material" around the "electric field-forming filament" constituting the yarn.

As the "dielectric material", for example, it is preferable to use a dielectric material capable of contributing to relaxation or neutralization of a positive (+) surface electrical potential, specifically, a surface treating agent (or a fiber treating agent), such as an oil or an antistatic agent, a detergent, a softener, or the like capable of inducing a negative (−) surface electrical potential. As the "dielectric material", it is more preferable to use a surface treating agent (or a fiber treating agent), such as an oil or an antistatic agent, containing a surfactant capable of inducing a negative (−) surface electrical potential, a detergent, a softener, or the like. In particular, it is preferable to use an anionic surfactant, specifically a surfactant having an anionic functional group.

Figure 7:
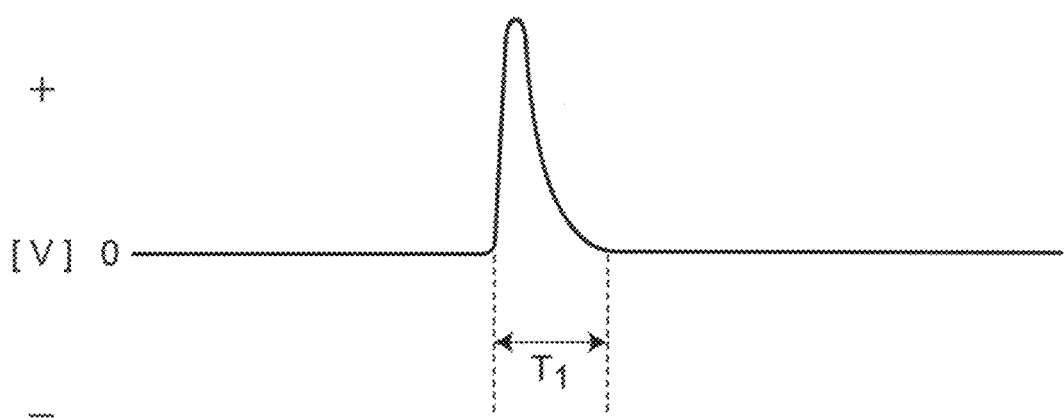
FIG. 7 is a conceptual diagram schematically illustrating the "disappearance" of a surface electrical potential of a yarn (Z yarn) according to one embodiment of the present invention.

For example, as shown in FIG. 7, a positive (+) surface electrical potential is generated by the "application" of an external force and a negative (−) surface electrical potential is generated by the "maintenance" of the external force, so that the surface electrical potentials cancel each other to become zero (0), the surface electrical potential is "relaxed", and the surface electrical potential "disappears" (for example, (II) in the row (A) in FIG. 5).

In this case, the generated surface electrical potential is usually 0.3 V or higher, for example, 1.0 V or higher, preferably 2.0 V or higher, more preferably 3.0 V or higher, and particularly preferably 4.0 V or higher.

The time $T_1$ required for the "disappearance" (or relaxation) of the surface electrical potential is, for example, 10 seconds, and preferably 2 to 3 seconds.

Figure 8:
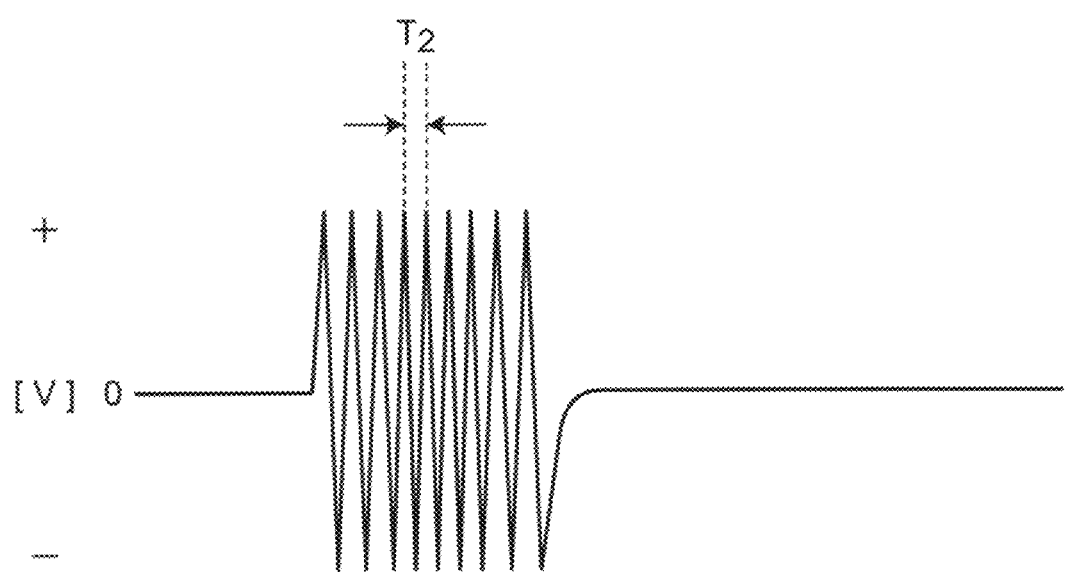
FIG. 8 is a conceptual diagram schematically illustrating the "inversion of polarity" of a surface electrical potential of a yarn (Z yarn) according to one embodiment of the present invention.

For example, as shown in FIG. 8, the polarity of the surface electrical potential can be "inverted" or "restored" by a repetition of (I) to (III) of FIG. 5 described above, particularly, the "application" (I) and the "release" (III) of the external force.

In this case, the inverted surface electrical potential is usually 0.3 V or higher, for example, 1.0 V or higher, preferably 2.0 V or higher, more preferably 3.0 V or higher, and particularly preferably 4.0 V or higher, and is preferably "equivalent" to the surface electrical potential before the inversion.

In the present disclosure, the surface electrical potential being "equivalent" means that the difference in surface electrical potential before and after the inversion is several percent, for example, less than ±10%, ±5% or less, ±3% or less, ±2% or less, or ±1% or less. The time $T_2$ required for the repetitive "inversion" or the "restoration" of the polarity of the surface electrical potential is, for example, 10 seconds or less, preferably 2 to 5 seconds.

Next, as illustrated in the row (B) in FIG. 5, in the yarn of the present disclosure ("yarn 2" (Z yarn)), (IV) a positive (+) surface electrical potential is "generated" by "applying" an external force (F) in the axial direction of the yarn, (V) the positive (+) surface electrical potential may be "kept" by "maintaining" the external force (F), and thereafter, (VI) the positive (+) surface electrical potential generated by the "application" of the external force (F) may be "disappeared" by "releasing" the external force (F) and the surface electrical potential may become zero (0).

The "controlled surface electrical potential" illustrated in the row (B) is mainly based on the "keeping" of the surface electrical potential of (V), and the mechanism thereof will be described in detail below together with the configuration of the yarn. However, the present invention is not limited to the mechanism described below.

Mechanism of (B)

For example, as illustrated in the row (B) in FIG. 5, in the yarn of the present disclosure ("yarn 2" (Z yarn)), (IV) a positive (+) electrical potential is generated on the surface of the yarn by "applying" an external force (F) (for example, tension or stress) in the axial direction of the yarn, and a negative (−) electrical potential can be generated inside the surface. In this case, (V) when the external force (F) is "maintained", the positive (+) surface electrical potential can be "kept".

In the present invention, examples of a conceivable method for "keeping" a positive (+) surface electrical potential on a surface of a yarn (specifically, an electric field-forming filament) without inducing a negative (−) surface electrical potential as described in the above (II) include: forming the yarn from only bare electric field-forming filaments; and exposing bare electric field-forming filaments by partially or entirely removing a dielectric material capable of contributing to relaxation or neutralization of the positive (+) surface electrical potential of the above (II), specifically a surface treating agent (or a fiber treating agent), such as an oil or an antistatic agent, a detergent, a softener, or the like capable of inducing a negative (−) surface electrical potential. In this case, "air" or an "air layer" is provided as a "dielectric material" around the bare electric field-forming filament.

In the present invention, for example, it is also preferable to further use a surface treating agent (or a fiber treating agent) such as an oil or an antistatic agent, a detergent, a softener, or the like capable of inducing a positive (+) surface electrical potential as the "dielectric material" around the "electric field-forming filament" constituting the yarn. It is more preferable to use, as the "dielectric material", a surface treating agent (or a fiber treating agent), such as an oil or an antistatic agent, a detergent, a softener, or the like containing a surfactant capable of inducing a positive (+) surface electrical potential. In particular, it is preferable to use a cationic surfactant, specifically a surfactant having a cationic functional group.

Figure 9A:
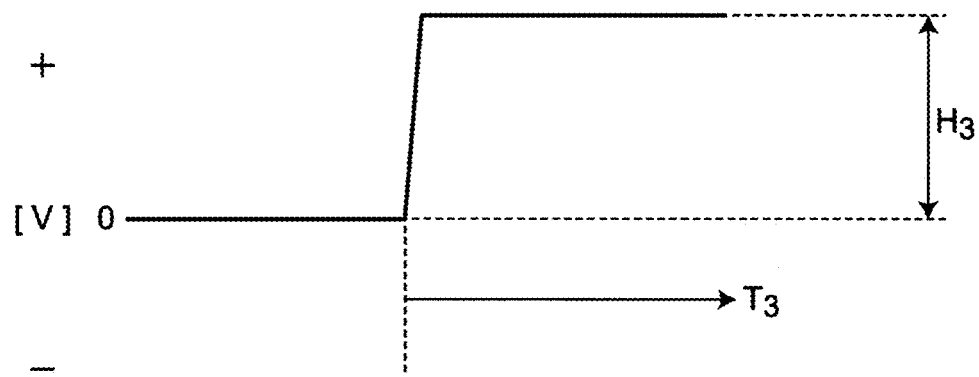
FIGS. 9A to 9C are conceptual diagrams schematically illustrating the "keeping" of a surface electrical potential of a yarn (Z yarn) according to one embodiment of the present invention.

For example, as illustrated in FIG. 9A, a positive (+) surface electrical potential is generated by the "application" of an external force, and the positive (+) surface electrical potential is "kept" by the "maintenance" of the external force.

The magnitude ($H_3$) of the surface electrical potential is usually 0.3 V or higher, for example, 1.0 V or higher, preferably 2.0 V or higher, more preferably 3.0 V or higher, and particularly preferably 4.0 V or higher.

The keeping time ($T_3$) of the surface electrical potential is, for example, 10 seconds or more, and preferably 20 seconds or more.

Note that FIG. 9A illustrates an ideal situation in which "the surface electrical potential is kept" by "maintaining the external force".

In the yarn of the present disclosure, there may be a correlation between the "external force" and the "surface electrical potential". For example, the "external force" and the "surface electrical potential" may decrease in a similar time scale. The decrease (or relaxation) with time in the "external force" and the decrease (or attenuation) with time in the "surface electrical potential" are preferably substantially simultaneous (these preferably have almost the same or similar timescales or preferably almost agree with each other in timescale).

For example, even in a situation where the surface electrical potential is "kept" by the "maintenance" of the external force (F) as illustrated in (V) in the row (B) in FIG. 5, the surface electrical potential may decrease (attenuate) with time as the external force decreases (relaxes) with time, and the time scales thereof may be almost the same.

Figure 9B:
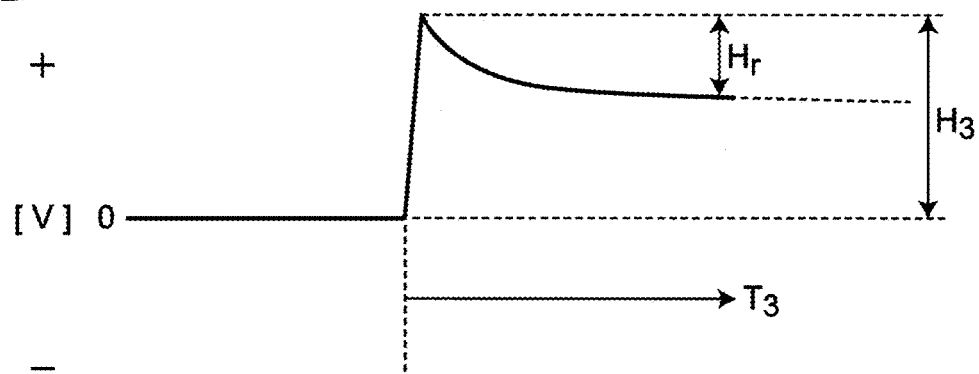

For example, FIG. 9B illustrates a case where the surface electrical potential decreases (attenuates) with time, but such a case is also included in the "keeping" of the surface electrical potential by the "maintenance" of the external force (F).

The yarn of the present disclosure is not limited to such an embodiment in which the surface electrical potential decreases (attenuates) with time.

In FIG. 9B, the decrease amount (or attenuation amount) ($H_r$) of the surface electrical potential is not particularly limited with respect to the surface electrical potential ($H_3$) (however, the case where the decrease amount ($H_r$) of the surface electrical potential is 100% based on the surface electrical potential ($H_3$) in the keeping time ($T_3$) of the surface electrical potential is not included).

In addition, when curve fitting (or curvilinear regression) is performed in accordance with a conventionally known method for a change (for example, decrease or relaxation) with time in the "external force" and for a change (for example, decrease or attenuation) with time in the "surface electrical potential", a result that the time constants ($\tau$) of both the changes are close to each other is obtained. Based on this result, it is expected that there is a relationship between the "change with time in the external force" and the "change with time in the surface electrical potential".

In the yarn of the present disclosure, the time constant ($\tau$) is, for example, 40 minutes or less, and preferably 1 minute or less. The "time constant ($\tau$)" means a constant representing a change time of an external force or a surface electrical potential taken from a time when the external force is applied to the yarn of the present disclosure or when the surface electrical potential is generated or when the surface electrical potential is determined to generate to a time when a predetermined state is established, and is a number serving as an indication of the time taken until the establishment of the predetermined state.

Figure 9C:
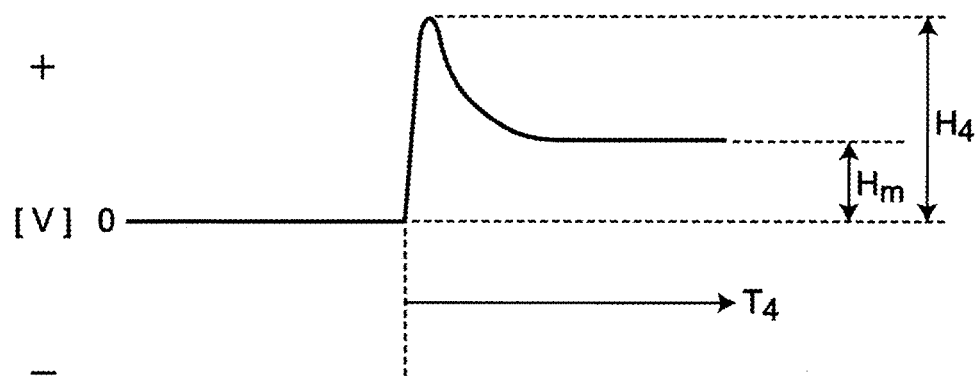

Furthermore, as illustrated in the graph of FIG. 9C, the generated surface electrical potential may be "kept" after decreasing. In this case, the magnitude ($H_4$) of the generated surface electrical potential is usually 0.3 V or higher, for example, 1.0 V or higher, preferably 2.0 V or higher, more preferably 3.0 V or higher, and particularly preferably 4.0 V or higher, and the surface electrical potential to be kept ($H_m$) is at least 20% or more of the surface electrical potential ($H_4$), for example, in a range of 30% to 100%, preferably 40% to 100%, and more preferably 50% to 100%. The surface electrical potential ($H_m$) may further decrease (decay) with time, for example, similarly to the graph shown in FIG. 9B.

The keeping time ($T_4$) of the surface electrical potential is, for example, 10 seconds or more, and preferably 20 seconds or more.

When the applied external force is released, the surface electrical potential may disappear ((VI) in row (B) in FIG. 5).

As described above, a positive (+) surface electrical potential is generated by "applying" an external force (F) to the yarn of the present disclosure (for example, "yarn 2" (Z yarn)), and the "controlled surface electrical potential" as described above can be generated by "maintaining" and/or "releasing" such an external force.

Figure 6:
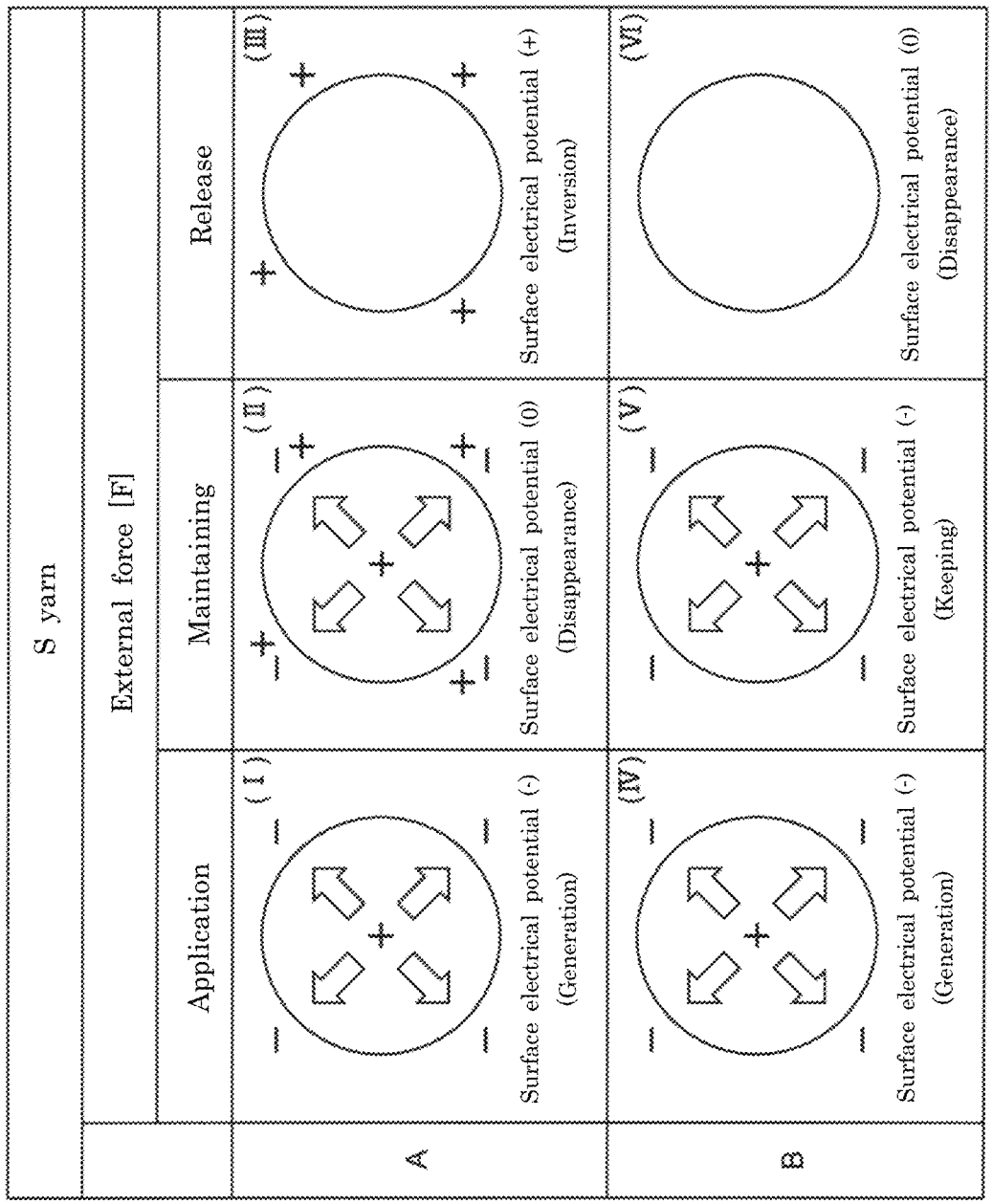
FIG. 6 is a conceptual diagram schematically illustrating a "controlled surface electrical potential" of a yarn (S yarn) according to one embodiment of the present invention.

Furthermore, similarly also in the yarn of the present disclosure (for example, "yarn 1" (S yarn)), a negative (−) surface electrical potential is generated by applying the external force (F), and a "controlled surface electrical potential" as illustrated, for example, in FIG. 6 can be similarly generated by "maintaining" and/or "releasing" such an external force.

As described above, in the present invention, there are two types of "controlled surface electrical potential": (A) a type based on the "relaxation" of the generated surface electrical potential (for example, (I), (II), and (III) in FIGS. 5 and 6); and (B) a type based on the "keeping" of the generated surface electrical potential (for example, (IV), (V), and (VI) in FIGS. 5 and 6).

[Measurement of Surface Electrical Potential]

A method for measuring the "surface electrical potential" of the yarn of the present disclosure will be described. Specifically, the surface electrical potential of the yarn of the present disclosure can be measured by at least the following (a) to (d):

(a) stretching (or elongating and contracting) the yarn of the present disclosure (or a measurement sample of the yarn of the present disclosure), preferably stretching uniaxially by a predetermined amount (stretching, for example in a range of 0 to 2%, preferably 0 to 1%, more preferably 0 to 0.5% (however, "0%" is not included in any case));

(b) covering (or wounding to coat) a core made of an electrically conductive fiber (for example, Cu/Sn wire) with the yarn of the present disclosure (for example, covering at 1150 T/m) (in the present description, an electrically conductive fiber covered with the yarn of the present disclosure is called "measurement sample") (the yarn of the present disclosure may be either a paralleled yarn or a co-twisted yarn; a co-twisted yarn may be prepared by covering a core with a paralleled yarn);

(c) grounding the core (accordingly, the core is to have an electrical potential of 0 V); and (d) measuring the surface electrical potential of the yarn of the present disclosure by an electric force microscope (EFM) at least at a point in time before the application of the external force, after the application of the external force, or after the release of the external force.

There is no particular limitation in the order of the above (a), (b), and (c). For example, (a) may be performed after (b) and (c). It is preferable to perform the measurement in the order of (b), (c), (a), and (d).

In the above (a), the surface electrical potential of the yarn may be measured via stretching the yarn of the present disclosure or the measurement sample to some extent (for example, about 0 to 0.5%) beforehand, and then further applying an external force to stretch (or elongate and contract) the yarn to about 0 to 2% in total.

For the yarn or the measurement sample of the present disclosure, it is preferable to allow the yarn to elongate and contract within a range of, for example, 2% or less, preferably 1% or less, and more preferably 0.5% or less as described above by the application and release of an external force. The "generation", "disappearance", "inversion of polarity", "restoration", and the like of the "surface electrical potential" in the yarn can thereby be appropriately controlled or adjusted. Thus, in the yarn of the present disclosure, the surface electrical potential of the yarn can be easily adjusted by small elongation and contraction of 2% or less.

EXAMPLES OF PREFERRED EMBODIMENTS

As the control of the "controlled surface electrical potential" of the yarn of the present disclosure, it is preferable that at least the surface electrical potential generated by the application of an external force "disappears" within a predetermined time (for example, the cases of (II) and (VI) in FIGS. 5 and 6, especially the cases of (II) in FIGS. 5 and 6). Here, the "predetermined time" is, for example, 10 seconds, and preferably 2 seconds to 3 seconds. As described above, in the yarn of the present disclosure, the surface electrical potential can be disappeared in a short time of 10 seconds or less, and the "disappearance" of the surface electrical potential can be freely controlled.

As the control of the "controlled surface electrical potential" of the yarn of the present disclosure, it is preferable that at least the surface electrical potential generated by the application of an external force is "kept" for more than a predetermined time (for example, the cases of (V) in FIGS. 5 and 6). Here, the "predetermined time" is, for example, 10 seconds, and preferably 20 seconds. As described above, in the yarn of the present disclosure, the surface electrical potential also can be kept for a long time, for example, exceeding 10 seconds, and the "keeping" of the surface electrical potential can be freely controlled.

As the control of the "controlled surface electrical potential" of the yarn of the present disclosure, it is preferable that the polarity of the surface electrical potential generated by the application of the external force is "inverted" by the "release" of the external force applied to the yarn (for example, the cases of (III) in FIGS. 5 and 6). Thus, in the yarn of the present disclosure, the polarity can be inverted. In addition, the disappeared polarity can be "restored" by a repetition of the application and the release of the external force.

Alternatively, as the control of the "controlled surface electrical potential" of the yarn of the present disclosure, it is preferable that (1) the surface electrical potential generated by the application of the external force is disappeared by the "release" of the external force applied to the yarn (for example, the cases of (VI) in FIGS. 5 and 6) or (2) the polarity of the surface electrical potential generated by the application of the external force is "inverted" by the "release" of the external force applied to the yarn (for example, the cases of (III) in FIGS. 5 and 6). As described above, in the yarn of the present disclosure, the generated surface electrical potential can be freely controlled by "disappearing" or "inverting" the surface electrical potential.

In the above (2), it is preferable that a magnitude of the surface electrical potential generated by the application of the external force is equivalent to a magnitude of the surface electrical potential having a polarity inverted by the release of the external force (for example, FIG. 8). As described above, in the yarn of the present disclosure, since a positive surface electrical potential and a negative surface electrical potential can be generated in almost the same magnitude, a surface electrical potential can be periodically generated.

Alternatively, in the above (2), the inversion of the polarity of the surface electrical potential is repeated by a repetition of the application and the release of the external force (for example, FIG. 8). Thus, in the yarn of the present disclosure, the polarity may be inverted, and the disappeared polarity may be "restored".

In the yarn of the present disclosure, it is preferable that the surface electrical potential generated by the application of the external force with the applied external force being maintained "disappears" within a predetermined time (for example, (II) in FIGS. 5 and 6). Here, the "predetermined time" is, for example, 10 seconds, and preferably 2 seconds to 3 seconds. As described above, in the yarn of the present disclosure, the surface electrical potential can be disappeared in a short time of, for example, 10 seconds or less, and the "disappearance" of the surface electrical potential can be freely controlled.

In the yarn of the present disclosure, it is preferable that the surface electrical potential generated by the application of the external force is "kept" at the same polarity for more than a predetermined time with the applied external force being maintained. Here, the "predetermined time" is, for example, 10 seconds, and preferably 20 seconds. As described above, in the yarn of the present disclosure, the surface electrical potential also can be kept for a long time, for example, exceeding 10 seconds, and the "keeping" of the surface electrical potential can be freely controlled.

In the yarn of the present disclosure, the surface electrical potential generated by the application of the external force is usually 0.3 V or higher, for example, 1.0 V or higher, preferably 2.0 V or higher, more preferably 3.0 V or higher, and particularly preferably 4.0 V or higher. When the surface electrical potential is, for example, 1.0 V or higher, it is possible to exhibit, in addition to a dust collection power, an antibacterial action by the generated electrical potential.

In the yarn of the present disclosure, the electric field-forming filament preferably comprises a "piezoelectric material". It is preferable to contain a "polylactic acid" as the "piezoelectric material". When the electric field-forming filament contains a piezoelectric material such as a polylactic acid, the surface electrical potential can be more appropriately controlled.

The crystallinity of the "polylactic acid" is preferably within a range of 15 to 55%. Within such a range, the piezoelectricity derived from polylactic acid crystals is high, so that polarization due to the piezoelectricity of the polylactic acid can be more effectively generated.

In the yarn of the present disclosure, a dielectric material is preferably provided around the electric field-forming filament. By providing the dielectric material, a surface electrical potential generated by application of an external force can be disappeared or kept. For example, by using a dielectric material capable of inducing a polarity opposite to the polarity of the surface electrical potential generated by the application of an external force, the polarities cancel each other, so that the surface electrical potential generated by the application of the external force can be disappeared (for example, (II) in FIGS. 5 and 6). In addition, for example, if the dielectric material is air, an air layer exists around the electric field-forming filament, that is, a bare electric field-forming filament can be exposed, so that the surface electrical potential generated by the application of an external force can be more appropriately maintained (for example, (V) in FIGS. 5 and 6).

The dielectric material preferably comprises an oil. As the oil, those containing an anionic surfactant (preferably one having an anionic functional group), a cationic surfactant (preferably one having a cationic functional group), of a nonionic surfactant are particularly preferable. When the dielectric material contains such an oil, the surface electrical potential can be more appropriately controlled according to the anionic, cationic, or nonionic functional group thereof.

The thickness (single fiber fineness) of the yarn of the present disclosure is preferably 0.005 to 10 dtex. When the single fiber fineness decreases, the number of filaments becomes too large, and fuzz easily occurs. On the other hand, when the single fiber fineness is large and the number of filaments is excessively small, the texture is impaired. The single fiber fineness referred to herein is a single fiber fineness of one yarn. When yarns are further combined, it means the single fiber fineness of one yarn before being combined.

Furthermore, the fiber strength of the yarn of the present disclosure is preferably 1 to 5 cN/dtex. Thus, the yarn can withstand without breaking even if greater deformation occurs due to generation of a high electrical potential. The fiber strength is more preferably 2 to 10 cN/dtex, still more preferably 3 to 10 cN/dtex, and most preferably 3.5 to 10 cN/dtex. For the same purpose, the elongation of the yarn of the present disclosure is preferably 10 to 50%.

[Use of Yarn of Present Disclosure]

The yarn of the present disclosure can be widely used as yarns for daily use and industrial use. Therefore, it can be processed into various structures (for example, filters and cloths) according to a desired use.

Specific uses of the yarn of the present disclosure are as described below, but the uses of the yarn of the present disclosure are not limited to those described below.

(1) Filter

In the yarn of the present disclosure, a positive or negative surface electrical potential is generated by applying an external force to the yarn in an axial direction of the yarn, and a "controlled surface electrical potential" can be generated by the "maintenance" or "release" of the external force. The "generation", "keeping", "disappearance", "inversion of polarity", "restoration", and the like of the "surface electrical potential" can be appropriately controlled or adjusted for an arbitrary period of time.

Therefore, by processing the yarn of the present disclosure into a "filter" by a method well known in the art or the like, a filter, preferably an electret filter, having the above-described "controlled surface electrical potential" can be provided.

In such an electret filter, since the "generation", "keeping", "disappearance", "inversion of polarity", and the like of a "surface electrical potential" can be freely performed, the operations of dust collection and dust disposal are simpler and easier. Specifically, dust collection and dust disposal can be easily performed by a simple operation of only pulling the filter.

In the yarn of the present disclosure, since the "surface electrical potential" is "restored", a rapid decrease in dust collection efficiency (or dust collection power) can be avoided. Specifically, the "surface electrical potential" is "restored" by a simple operation of only pulling the filter, so that the dust collection efficiency is restored.

(2) Cloth

Since the yarn of the present disclosure contains, as an electric field-forming filament (or charge-generating fiber), a fiber capable of generating an electrical potential (or charges) due to an external energy and forming an electric field, an electric field is formed in the vicinity of the yarn, or the yarn can form an electric field between such yarns or when the yarn is brought close to an object having a predetermined electrical potential (including the ground electrical potential), such as a human body).

Therefore, the yarn of the present disclosure can directly exhibit an antibacterial property in response to an electric stimulation due to such an electric field (see, for example, Tetsuaki Tsuchido, Hiroki Kourai, Hideaki Matsuoka, and Junichi Koizumi "Microbial Control-Science and Engineering": Kodansha; and see for example, Koichi Takaki "Agricultural and Food Processing Applications of High-Voltage and Plasma Technologies," J. HTSJ, Vol. 51, No. 216).

Furthermore, in relation to such electrical stimulation, it has been known that cells are killed, for example, by generating an electrical potential of 1.0 V or higher (Mechanism of electroporation: Basis of electric-pulse mediated gene transfer, written by Michio KASAI and Hiroko INABA, page 1595). Therefore, the yarn of the present disclosure can exhibit a superior antibacterial property such as killing cells.

Furthermore, the yarn of the present disclosure can also allow an electric current to flow when the yarn approaches another adjacent fiber or an object having a predetermined electrical potential such as a human body via moisture such as sweat. Therefore, the yarn of the present disclosure may exhibit an antibacterial property also by such an electric current.

Accordingly, when the yarn of the present disclosure is applied to an article or a product that is to be used close to an object having a predetermined electrical potential such as a human body, for example, the yarn can exhibit the antibacterial property as described above by the action of the generated electric field or electric current, especially the direct action of the electric field.

The article or product to which the yarn of the present disclosure can be applied is not particularly limited, and examples thereof include clothing (general), footwear (general), and medical supplies (general) such as masks. More specifically, the following applications are conceivable.

For example, clothing items in general, particularly, underwear (especially, socks), towels, footwear in general, for example, insoles for shoes and boots, sportswear in general, hats, bedding (including duvets, mattresses, sheets, pillows, pillows covers, and the like), toothbrushes, flosses, various filters (filter and the like of water purifier, air conditioner, or air purifier), stuffed animals, pet-related products (mat for pet, clothing for pet, and inner of clothing for pet), various mat products (foot, hand, toilet seat, or the like), curtains, kitchen utensils (sponges, cloths, or the like), seats (seats of cars, trains, airplanes or the like), cushioning materials for motorbike helmets and exterior materials thereof, sofas, medical items in general, including bandages, gauzes, masks, sutures, clothes for doctors and patients, and supporters, sanitary items, sporting goods (inner of wear and glove, gauntlet used in martial arts, or the like), packaging materials, and the like can be cited.

Of the clothing items, in particular, socks (or supporters) always elongate and contract along joints due to movement such as walking, and thus the yarn of the present disclosure can generate an electrical potential (or charges) with a high frequency. In addition, socks absorb moisture such as sweat and serve as a hotbed for the proliferation of germs and the like, but since the yarn of the present disclosure can suppress the proliferation of germs, it produces a remarkable effect for antibacterial purposes for odor prevention.

The yarn of the present disclosure is considered to be suitable for all applications requiring antibacterial properties, and the applications are not particularly limited to the above applications.

Therefore, the yarn of the present disclosure can be appropriately processed into a cloth such as a woven fabric, a knitted fabric, or a nonwoven fabric by a method well known in the art, and can be appropriately used as a cloth that exhibits an antibacterial property in the above uses.

Hereinafter, the yarn of the present disclosure will be described in more detail by way of examples. The yarn of the present disclosure is not limited to the description of the following examples.

EXAMPLES

"Yarn A" and "Yarn B" to be used in Examples were prepared.

Yarn A 84 dtex-24 filaments (polylactic acid having a crystallinity of 41%, a crystal size of 12 nm, and a degree of orientation of 97%) were used as "yarn A". A surfactant capable of inducing a negative (−) electrical potential (or charges) was attached as a yarn making oil (dielectric material) to the surface of each filament.

Yarn B 84 dtex-24 filaments (polylactic acid having a crystallinity of 41%, a crystal size of 12 nm, and a degree of orientation of 97%) were used as "yarn B". Nothing was attached to the surface of the filaments, and bare filaments were exposed on the surface of the yarn (dielectric material: air).

The surface electrical potential of the yarn was measured in accordance with the following procedure. The measurement conditions will be described in detail in the following Examples 1 to 4.

Procedure for Measuring Surface Electrical Potential

First, a measurement sample is prepared by winding a yarn to be measured around a core made of an electrically conductive fiber (Cu/Sn wire) (covering (Z yarn): 1150 T/m, length in the axial direction: 40 mm). Heat treatment is performed at 85° C. (in air) for 40 minutes in order to maintain the covering shape. By this heat treatment, the crystallinity was 45%.

Next, the core (electrically conductive fiber) of the measurement sample is grounded (accordingly, the electrical potential of the electrically conductive fiber is 0 V).

After both ends of the measurement sample are gripped with rigid jigs and neutralized with an ionizer, the measurement sample is stretched in the axial direction.

At least at a point in time before the application of the external force to the yarn, after the application of the external force to the yarn, or after the release of the external force to the yarn, the surface electrical potential of the yarn is measured by an electric force microscope (manufactured by TREK JAPAN, Model 1100TN).

Example 1

The surface electrical potential of the "yarn A" (Z yarn) of the present disclosure was measured in accordance with the above measurement procedure and the following measurement conditions.

Measurement Conditions

Elongation and contraction: 0.25% (the sample was previously stretched by 0.5% from an initial length of 40 mm and neutralized with an ionizer, and then further stretched therefrom to 0.75%, and elongation and contraction were repeated between "0.5% and 0.75%") (the "application" and the "release" of the external force were repeated).

Tensile speed: 0.1 mm/sec

Figure 10:
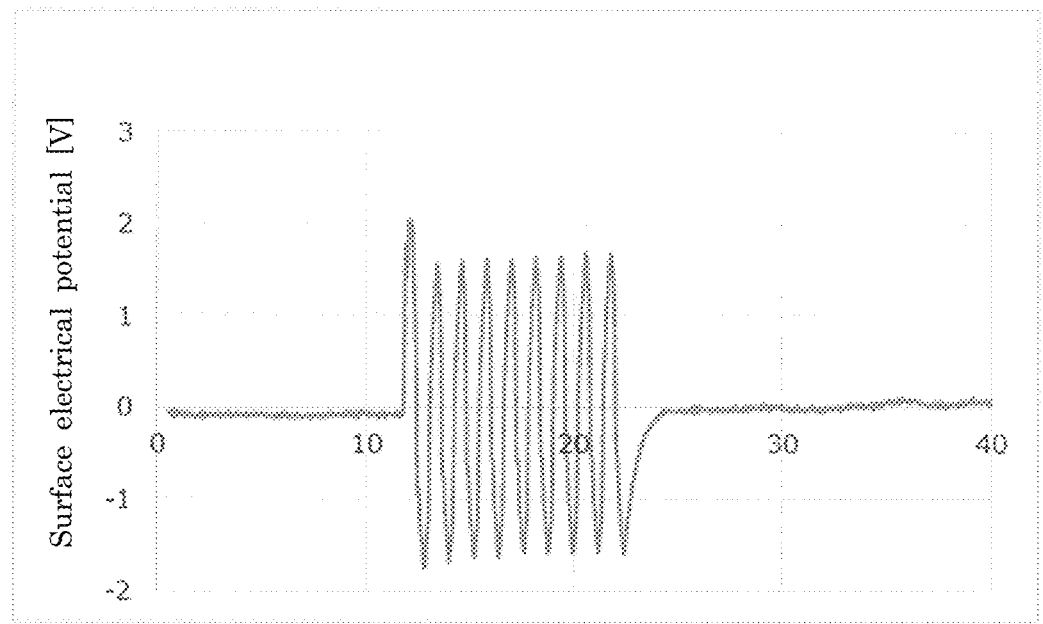
FIG. 10 is a graph illustrating a result of measuring a surface electrical potential of a "yarn A" in Example 1.

The measurement results of the surface electrical potential are shown in the graph of FIG. 10.

The graph of FIG. 10 demonstrated that by a repetition of the elongation and contraction of the yarn, the polarity of the surface electrical potential was "inverted" and the surface electrical potential of the yarn of the present disclosure showed the behavior illustrated in the row (A) in FIG. 5. In addition, it was found that both the positive surface electrical potential and the negative surface electrical potential were higher than 1.5 V and the magnitudes thereof were equivalent. In addition, the surface electrical potential could be adjusted over 3.0 V or higher in total of the positive and the negative.

Example 2

The surface electrical potential of "yarn A" and "yarn B" (both Z yarns) of the present disclosure was measured in accordance with the above-described measurement procedure and the following measurement conditions.

Measurement Conditions

Tensile amount: 0.5% (0.2 mm) (The "application" of the external force was maintained.)

Tensile speed: 0.1 mm/sec

Figure 11:
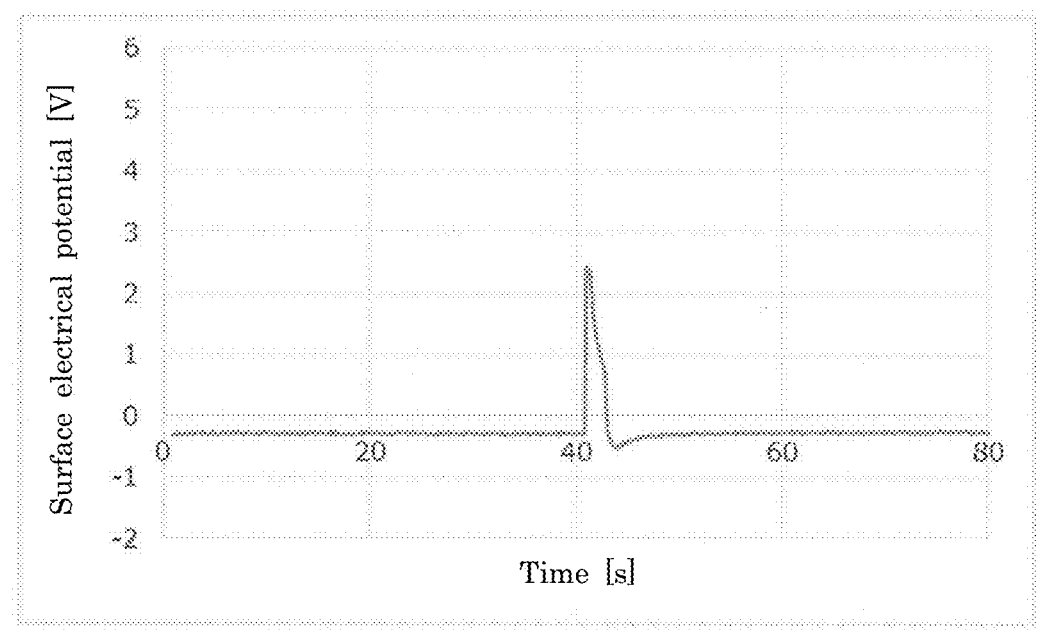
FIG. 11 is a graph illustrating a result of measuring a surface electrical potential of a "yarn A" in Example 2.
Figure 12:
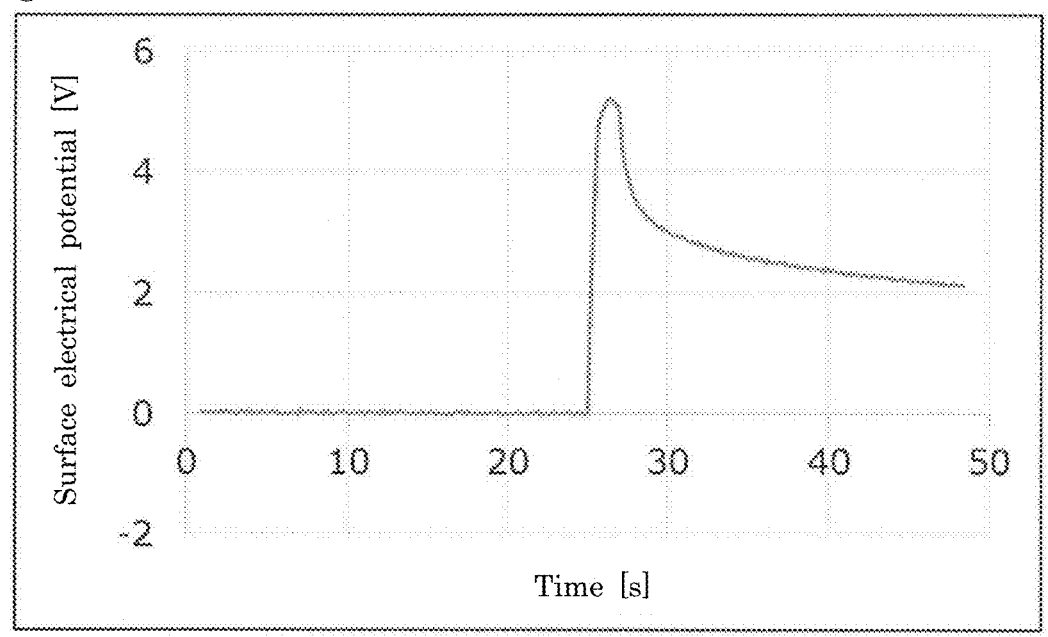
FIG. 12 is a graph illustrating a result of measuring a surface electrical potential of a "yarn B" in Example 2.

The measurement results of the surface electrical potential are shown in the graphs of FIG. 11 (yarn A) and FIG. 12 (yarn B).

As shown in the graph of FIG. 11, it has been found that in the "yarn A", a positive (+) electrical potential is generated by the application of an external force, an electrical potential (or charges) with an opposite polarity is induced due to the oil, so that the positive (+) surface electrical potential is relaxed and the surface electrical potential disappears within 2 seconds ("disappearance" in (II) in the row (A) in FIG. 5).

As shown in the graph of FIG. 12, it has been found that also in the "yarn B", a positive (+) electrical potential is generated by the application of an external force, but since an oil or the like is not attached, an electrical potential (or charges) with an opposite polarity is not induced, so that a positive (+) surface electrical potential is kept for 20 seconds or more ("keeping" in (V) in the row (B) in FIG. 5). When the application of the external force was "released", the surface electrical potential disappeared ("disappearance" in (VI) in the row (B) in FIG. 5).

In addition, as shown in the graph of FIG. 12, a surface electrical potential of 4.0 V or higher could be generated.

Example 3

The surface electrical potential of the "yarn A" (Z yarn) of the present disclosure was measured in accordance with the above measurement procedure and the following measurement conditions.

Measurement Conditions

Pretreatment a: no treatment

Pretreatment b: before measuring the surface electrical potential, the measurement sample was pretreated (immersed in a solvent) in a solvent (isopropyl alcohol (IPA)) at 25° C. for 2 minutes.

Tensile amount: 0.5% (0.2 mm) (The "application" of the external force was maintained.)
Tensile speed: 0.1 mm/sec The measurement results of the surface electrical potential are shown in the graphs of FIG. 13 (yarn A, pretreatment a: no treatment) and FIG. 14 (yarn A, pretreatment b: solvent immersion).

Figure 13:
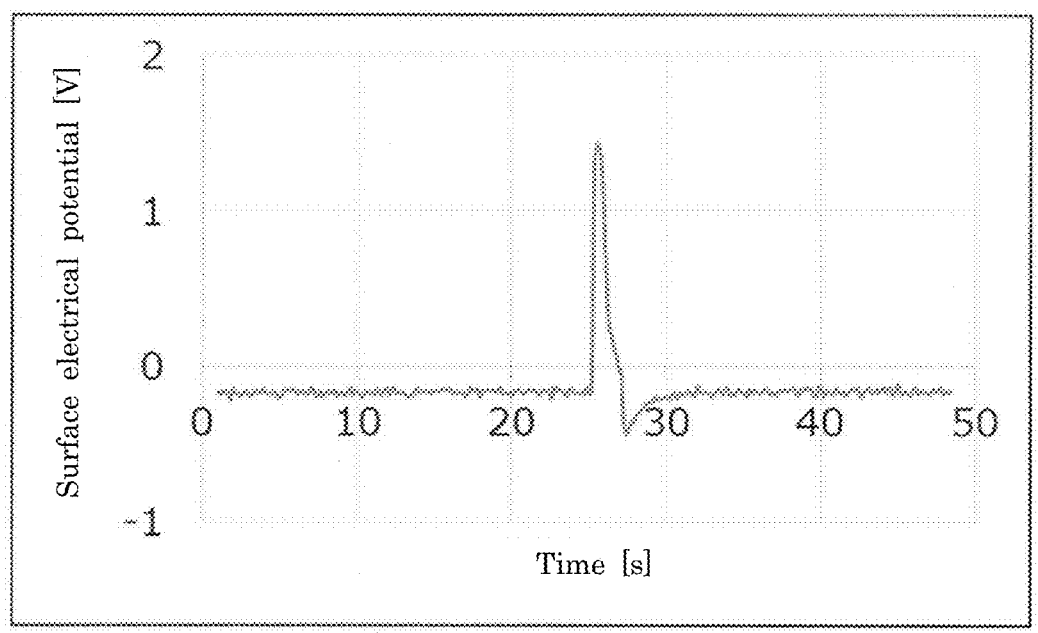
FIG. 13 is a graph illustrating a result of measuring a surface electrical potential of a "yarn A" (pretreatment a) in Example 3.

In the graph of FIG. 13 (yarn A, pretreatment a: no treatment), it has been found that since the oil was attached without having been removed, an electrical potential (or charges) with an opposite polarity is induced by the oil similarly to the graph shown in FIG. 11 and the surface electrical potential disappears within 3 seconds from the relaxation of the positive (+) electrical potential generated by an external force ("disappearance" in (II) in the row (A) in FIG. 5).

Figure 14:
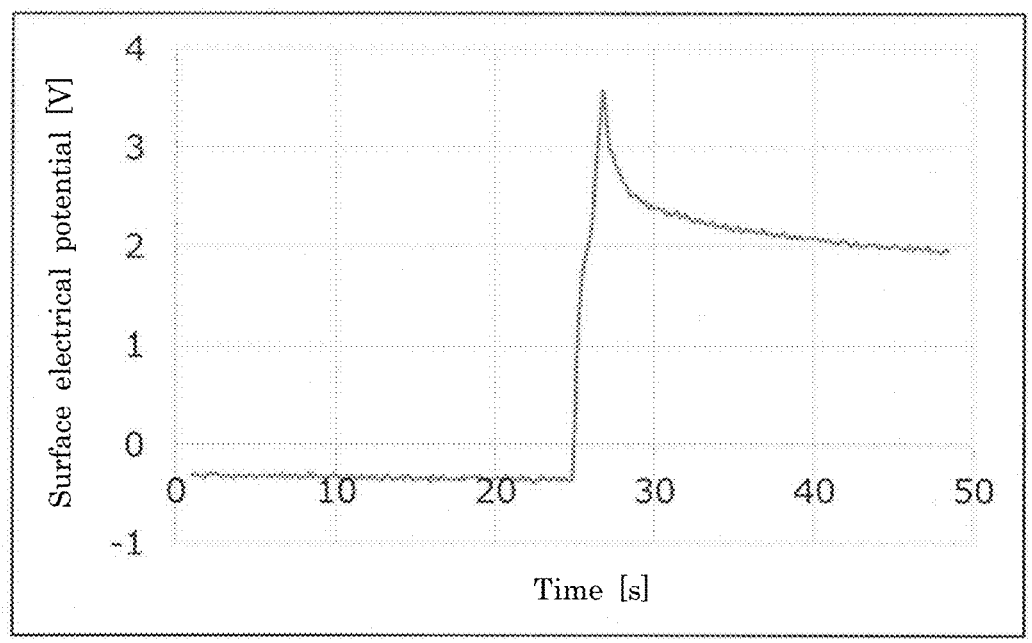
FIG. 14 is a graph illustrating a result of measuring a surface electrical potential of a "yarn A" (pretreatment b) in Example 3.

In the graph of FIG. 14 (yarn A, pretreatment b: solvent immersion), it has been found that since the oil was removed by the "pretreatment b" (solvent immersion), the electrical potential (or charges) with an opposite polarity is not induced and the surface electrical potential is kept for 20 seconds or more ("keeping" in (V) in the row (B) in FIG. 5). When the application of the external force was "released", the surface electrical potential disappeared ("disappearance" in (VI) in the row (B) in FIG. 5).

Example 4

Among the procedures for measuring the surface electrical potential of the "yarn A" (Z yarn) of the present disclosure, only the heating treatment condition for the purpose of maintaining the covering shape was changed to "120° C. (in air)" for "40 minutes". By this heat treatment, the crystallinity was 54% (crystal size: 14 nm, degree of orientation: 97%). The measurement was performed in accordance with the following conditions.

Measurement Conditions
Pretreatment a: no treatment
Pretreatment b: before measuring the surface electrical potential, the measurement sample was pretreated (immersed in a solvent) in a solvent (isopropyl alcohol (IPA)) at normal temperature for 2 minutes.
Pretreatment c: before measuring the surface electrical potential, the measurement sample was pretreated by washing twice by a method conforming to the "standard washing method" of the method for washing SEK Mark textile products (product certification department of Japan Textile Evaluation Technology Council).
Tensile amount: 0.5% (0.2 mm) (The "application" of the external force was maintained.)
Tensile speed: 0.1 mm/sec The measurement results of the surface electrical potential are shown in the graphs of FIG. 15 (yarn A, pretreatment a: no treatment), and FIG. 16 (yarn A, pretreatment b: solvent immersion), and FIG. 17 (yarn A, pretreatment c: washing).

Figure 15:
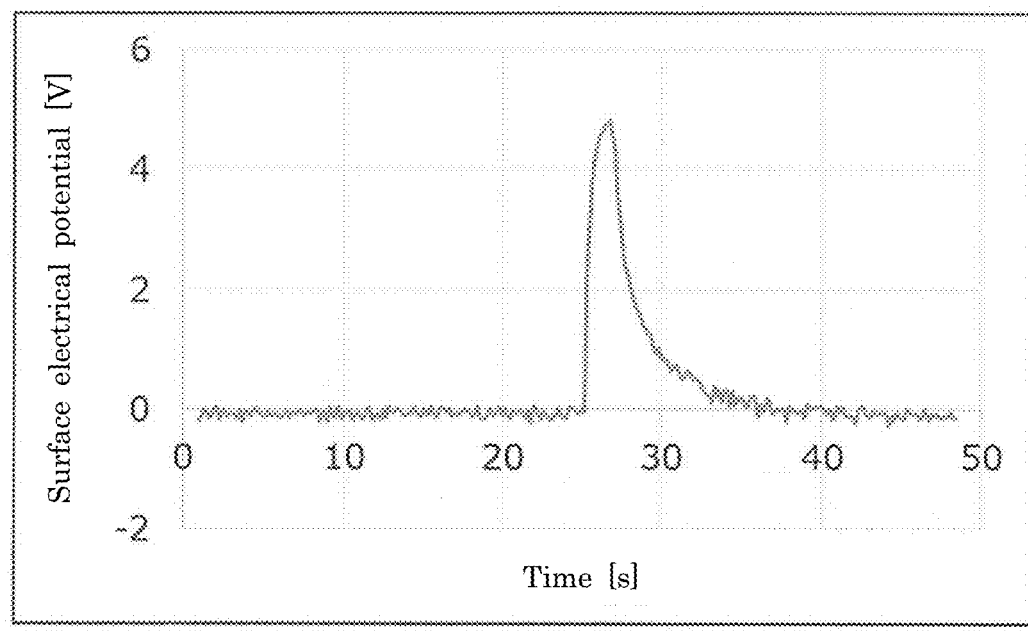
FIG. 15 is a graph illustrating a result of measuring a surface electrical potential of a "yarn A" (pretreatment a) in Example 4.

In the graph of FIG. 15 (yarn A, pretreatment a: no treatment), it was found that since the oil was attached without having been removed, a negative (−) electrical potential (or charges) is induced by the oil similarly to the graphs shown in FIGS. 11 and 13 and the surface electrical potential disappears within 8 seconds from the relaxation of the positive (+) electrical potential generated by an external force ("disappearance" in (II) in the row (A) in FIG. 5).

In addition, as shown in the graph of FIG. 15, a surface electrical potential of 4.0 V or more could be generated.

Figure 16:
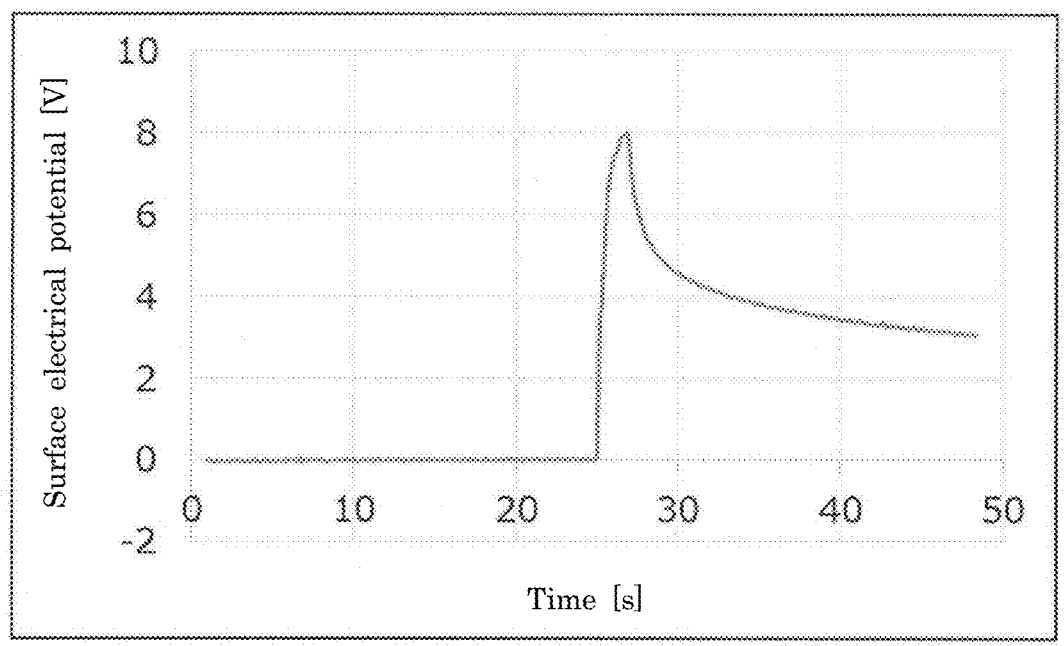
FIG. 16 is a graph illustrating a result of measuring a surface electrical potential of a "yarn A" (pretreatment b) in Example 4.

In the graph of FIG. 16 (yarn A, pretreatment b: solvent immersion), it was found that since the oil was removed by the "pretreatment b" (solvent immersion), the electrical potential (or charges) with an opposite polarity was not induced and the surface electrical potential was kept for 20 seconds or more ("keeping" in (V) in the row (B) in FIG. 5). When the application of the external force was "released", the surface electrical potential disappeared ("disappearance" in (VI) in the row (B) in FIG. 5).

In addition, as shown in the graph of FIG. 16, a surface electrical potential of about 8 V could be generated.

In Example 4, as compared with Example 3, the crystallinity was improved and the surface electrical potential could be further improved by increasing the heating condition for maintaining the covering shape to "120° C.".

Figure 17:
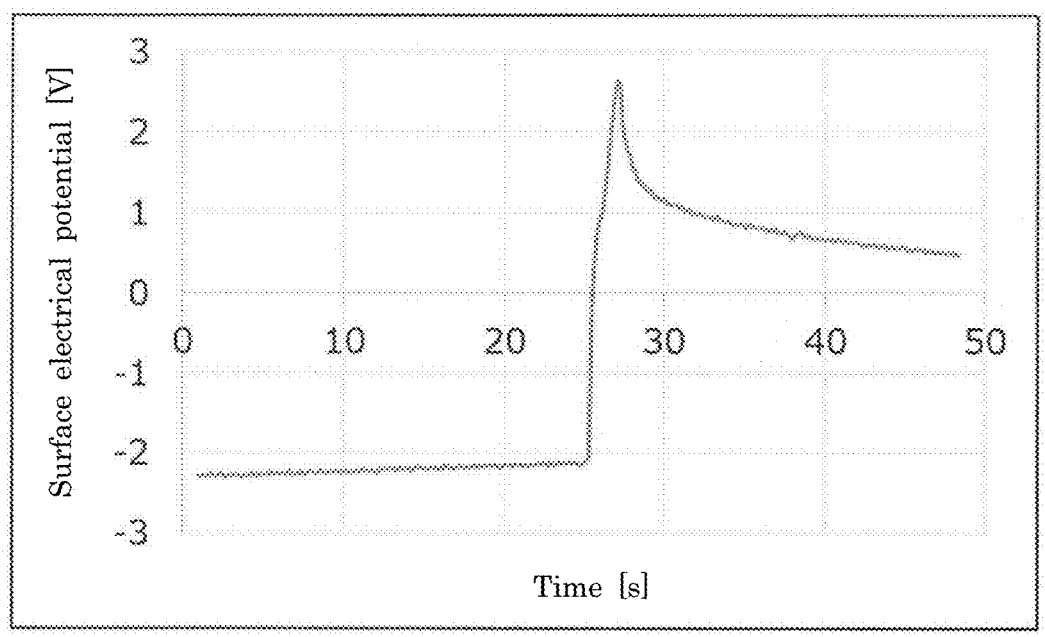
FIG. 17 is a graph illustrating a result of measuring a surface electrical potential of a "yarn A" (pretreatment c) in Example 4.

Similarly, also in the graph of FIG. 17 (yarn A, pretreatment c: washing), it was found that since the oil was removed by the "pretreatment c" (washing), the electrical potential (or charges) with an opposite polarity was not induced and the surface electrical potential was kept for 20 seconds or more ("keeping" in (V) in the row (B) in FIG. 5). When the application of the external force was "released", the surface electrical potential disappeared ("disappearance" in (VI) in the row (B) in FIG. 5).

From these Examples, it has been demonstrated that with the yarn of the present disclosure, the "generation", "maintenance", "disappearance", "restoration", "inversion of polarity" and the like of a surface electrical potential can be controlled for a predetermined or desired time, and the above-described "controlled surface electrical potential" could be achieved.

Furthermore, in the yarn of the present disclosure, a surface electrical potential of at least 1.0 V or higher is generated, and thus an "antibacterial property" due to such an electrical potential can be also exhibited.

Furthermore, in the yarn of the present disclosure, the surface electrical potential can be disappeared in a short time of less than 10 seconds (for example, FIGS. 11, 13, and 15), or the surface electrical potential can be kept for a long time of more than 10 seconds (for example, FIGS. 12, 14, 16, and 17). Therefore, an antibacterial property can be exhibited in garments or the like containing the yarn of the present disclosure in a short time of less than 10 seconds in accordance with a periodic fast motion (for example, a keyboard operation of 1 Hz or more, a motion such as walking), or an antibacterial property can be exhibited for a long time of more than 10 seconds even in an aperiodic motion (for example, listening of less than 1 Hz or a stationary state).

The present invention can be used for various products. For example, the present invention can be suitably used in daily products in which yarns are used (especially, general clothing products) and industrial products (especially, filters). In addition, it can also be suitably used in daily products with which an antibacterial property is required (especially, general clothing products).

What is claimed is:
1. A yarn comprising:
an electric field-forming filament comprising polylactic acid having a crystallinity of 15 to 55%; and
a dielectric material containing a surfactant having a cationic functional group or an anionic functional group over an entire circumference of the electric field forming filament,
wherein the yarn is constructed such that a positive or negative surface electrical potential is generated by applying an external force to the yarn in an axial direction of the yarn, and constructed such that a controlled surface electrical potential is generated by a maintenance or release of the external force.

2. The yarn according to claim 1, wherein the yarn is constructed such that the generated surface electrical potential disappears within a predetermined time or is maintained for more than a predetermined time.

3. The yarn according to claim 1, wherein the yarn is constructed such that a polarity of the generated surface electrical potential is inverted by the release of the external force.

4. The yarn according to claim 1, wherein, the yarn is constructed such that:
 (i) the generated surface electrical potential by the application of the external force disappears by the release of the external force; or
 (ii) a polarity of the generated surface electrical potential by the application of the external force is inverted by the release of the external force.

5. The yarn according to claim 4, wherein, in (ii), a magnitude of the surface electrical potential generated by the application of the external force is equivalent to a magnitude of the surface electrical potential having the polarity inverted by the release of the external force.

6. The yarn according to claim 4, wherein, in (ii), the inversion of the polarity of the surface electrical potential is repeated by a repetition of the application and the release of the external force.

7. The yarn according to claim 1, wherein the yarn with the applied external force being maintained is constructed such that the generated surface electrical potential disappears within a predetermined time.

8. The yarn according to claim 1, wherein the yarn with the applied external force being maintained is constructed such that the generated surface electrical potential is kept at the same polarity for more than a predetermined time.

9. The yarn according to claim 1, wherein the surface electrical potential of the yarn is measured by the following (a) to (d):
 (a) stretching the yarn;
 (b) covering a core made of an electrically conductive fiber with the yarn;
 (c) grounding the core; and
 (d) measuring the surface electrical potential by an electrical force microscope at least at a point in time before the application of the external force, after the application of the external force, or after the release of the external force.

10. The yarn according to claim 1, wherein the yarn is elongated and contracted within a range of 2% or less by the application and the release of the external force.

11. The yarn according to claim 1, wherein the surface electrical potential is 1.0 V or higher.

12. The yarn according to claim 1, wherein a fiber strength of the yarn is 1 to 10 cN/dtex.

13. A structure comprising the yarn according to claim 1.

14. The structure according to claim 13, wherein the structure is a filter or a cloth.

* * * * *